United States Patent [19]

Beach, Jr.

[11] 4,214,557

[45] Jul. 29, 1980

[54] PIVOTING WALL TYPE, FOUR STROKE, INTERNAL COMBUSTION, ROTARY ENGINE

[76] Inventor: Corbett D. Beach, Jr., Rte. 1, Box 218, Mannington, W. Va. 26582

[21] Appl. No.: 933,840

[22] Filed: Aug. 15, 1978

[51] Int. Cl.² ............................................. F02B 53/00
[52] U.S. Cl. ................................................... 123/18 R
[58] Field of Search ............. 123/18 R, 225; 418/116, 418/113, 122

[56] References Cited

U.S. PATENT DOCUMENTS

| | | | |
|---|---|---|---|
| 823,607 | 6/1906 | MacDonald | 418/122 X |
| 3,707,073 | 12/1972 | Bernstein | 123/18 R X |

FOREIGN PATENT DOCUMENTS 2362187  6/1975  Fed. Rep. of Germany ........ 123/18 R

*Primary Examiner*—Michael Koczo

*Attorney, Agent, or Firm*—LeBlanc, Nolan, Shur & Nies

[57] ABSTRACT

A four stroke, internal combustion, rotary engine which completes a four stroke cycle in one revolution is described. The engine consists of a wedge shaped combustion chamber having a pivotal wall, and intake and exhaust valves, together with a spark plug or injector for diesel operation. Abutting the combustion chamber pivotal wall is a circular chamber having a rotor therein with two opposed vertices. The vertices mount rollers which engage the walls of the circular chamber. The rotor is displaced by the pivotal wall moving downwardly during the combustion phase to open an exhaust port in the circular chamber. Continued rotation of the rotor then displaces the pivotal wall upwardly to exhaust the combustion chamber, so that the chamber may intake, displacing the pivotal wall downwardly. Continued rotation then displaces the pivotal wall upwardly to compress the fuel mixture for combustion, completing the cycle.

4 Claims, 5 Drawing Figures

PIVOTING WALL TYPE, FOUR STROKE, INTERNAL COMBUSTION, ROTARY ENGINE

This invention relates to a four stroke, internal combustion, rotary engine in which combustion is extended over a major portion of each revolution so that combustion results in high efficiency. Combustion is also very nearly complete to produce low pollution exhaust. The engine of this invention completes a four stroke cycle in one revolution of a rotor, and multiple units may be coupled together to meet power requirements.

Rotary engines are well known, and the prior art discloses many different types which are designed to overcome inherent inefficiencies in reciprocating piston engines. The configuration of moving parts in certain prior art devices has proven costly, and sealing problems have contributed to overall inefficiency.

It has been proposed to utilize, as in U.S. Pat. No. 3,867,912, a pair of toroidal compression and power units of similar construction having pistons on a common drive shaft. The pair of chambers are intended to increase the volumetric capacity, and effect combustion over a major portion of each revolution. However, this unit also requires a pair of valve units on a common valve shaft contributing to increased space requirements.

In U.S. Pat. No. 3,877,850, a single spherical casing is provided for a rotating power device which utilizes a spherical cavity or chamber with a piston positioned between a pair of rotating wedge shaped pistons having angularly disposed axes. The pistons however rotate within the spherical casing whereby although the casing is relatively compact, an increased number of moving parts is required.

In contrast, the instant invention provides a wedge shaped combustion chamber, and a circular chamber housing a rotor mounted on a drive shaft. The chambers are separated by a pivoting wall which moves into and out of the combustion chamber for compression, ignition, exhaust, and intake responsive to rotation of a cam surface on the rotor. Accordingly, combustion is insured over a major portion of each revolution, and complete combustion and high efficiency results. Moreover, the engine is light weight, compact, and smoother than a reciprocating piston engine in operation. A four stroke combustion cycle extends over a single revolution of the drive shaft whereby the drive shaft of a conventional reciprocating piston must make two revolutions to complete a cycle.

Accordingly, it is an object of this invention to provide a unique four stroke, internal combustion, rotary engine having a wedge shaped combustion chamber and a cam actuated pivoting wall in place of the conventional reciprocating piston.

It is another object of this invention to provide a high efficiency rotary engine wherein combustion will extend over a major portion of each revolution of the drive shaft and the four stroke cycle is completed in a single revolution thereof.

It is yet another object of this invention to provide a four stroke, internal combustion, rotary engine which may be utilized either with a conventional spark plug or with injectors for diesel operation, and which units may be coupled together to meet power requirements whereby the four stroke cycle is completed in a single revolution of the drive shaft.

These and other objects will become readily apparent with reference to the drawings and following description wherein.

Figure 1:
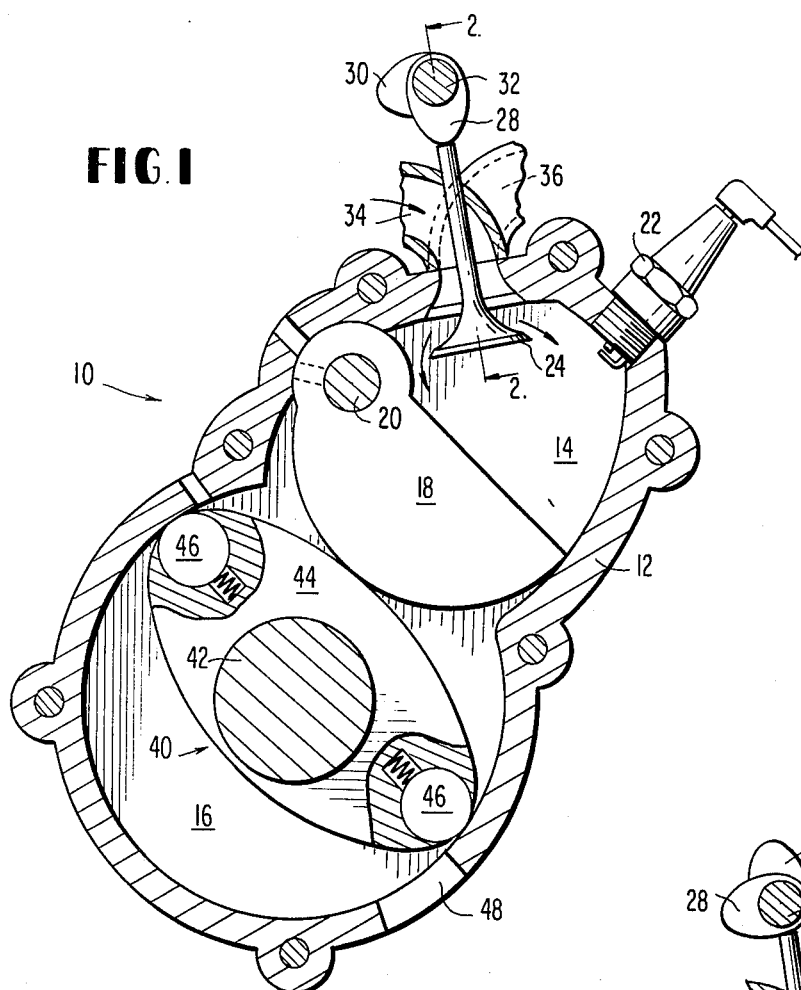
FIG. 1 is a fragmentary view of the device of this invention, in section, showing the intake of fuel to the cylinder.

With reference to the drawings, the rotary engine of this invention 10 includes a housing 12 which defines a combustion chamber 14 which is wedge shaped in cross-section and a chamber 16 which is generally circular in cross-section disposed adjacent thereto. The combustion chamber 14 has a wall 18 adapted to pivot about pin 20. Wall 18 mounts an integral cam follower 19. A conventional spark plug 22 is shown, but, as will be obvious to those skilled in the art, this spark plug may be replaced with an injector (not shown) for diesel operation.

Figure 2:
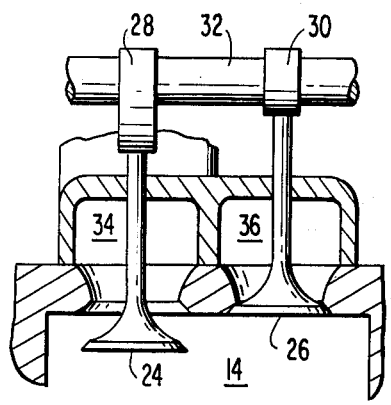
FIG. 2 is a fragmentary cross-sectional view taken along line 2—2 of FIG. 1.

With reference to FIG. 2, intake and exhaust valves 24 and 26, respectively, are provided. Valves 24 and 26 are of conventional design, and are driven by opposed cams 28 and 30 on valve shaft 32. As will be obvious to those skilled in the art, valve 24 opens to admit the fuel air mixture for combustion from line 34. Valve 26 then opens to admit exhaust gases from chamber 14 to the exhaust manifold 36. Chamber 16 contains a rotor 40 which turns shaft 42. Rotor 40 has an offset cam surface 44, and sealing, biased, rollers 46 at either end thereof which rollers ride the internal surface of chamber 16. Rollers 46 and offset cam 44 are followed as rotor 40 rotates by follower 19. Chamber 16 also defines an exhaust port 48 for the removal of exhaust materials as will be subsequently explained.

FIGS. 1, 3, 4 and 5, show the four strokes or phases of operation through one combustion cycle of the device of this invention. In these figures, both valve shaft 32, and drive shaft 42, rotate clockwise.

Figure 3:
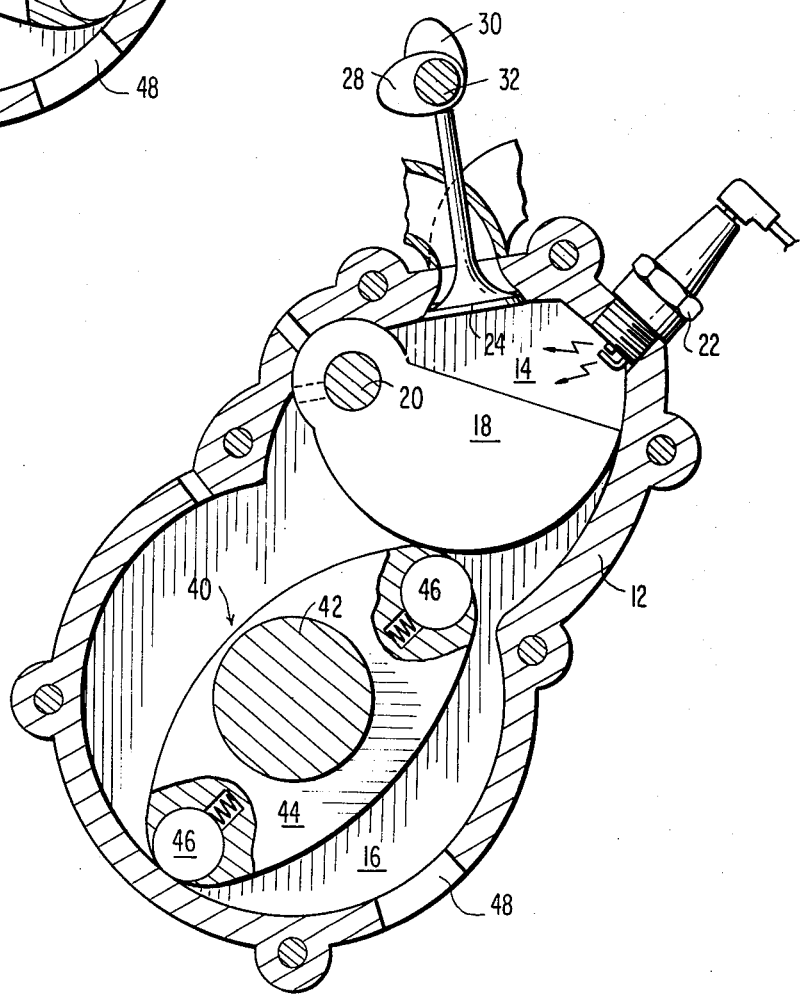
FIG. 3 is a cross-sectional view similar to FIG. 1 showing the compression phase of the cycle.

With attention to FIG. 1, with the intake of fuel, the pivotal wall 18 rotates into chamber 16 against cam surface 44, as cam 28 then opens valve 24 to admit fuel to the combustion chamber 14. With attention to FIG. 3, as shaft 42 rotates clockwise, the cam surface 44, and ultimately roller 46 cause the wall 18 to pivot into chamber 14 to compress the fuel mixture in combustion chamber 14. When the rotor 40 has reached its high point as shown in FIG. 3, the compressed fuel mixture in chamber 14 is ignited by plug 22.

Figure 4:
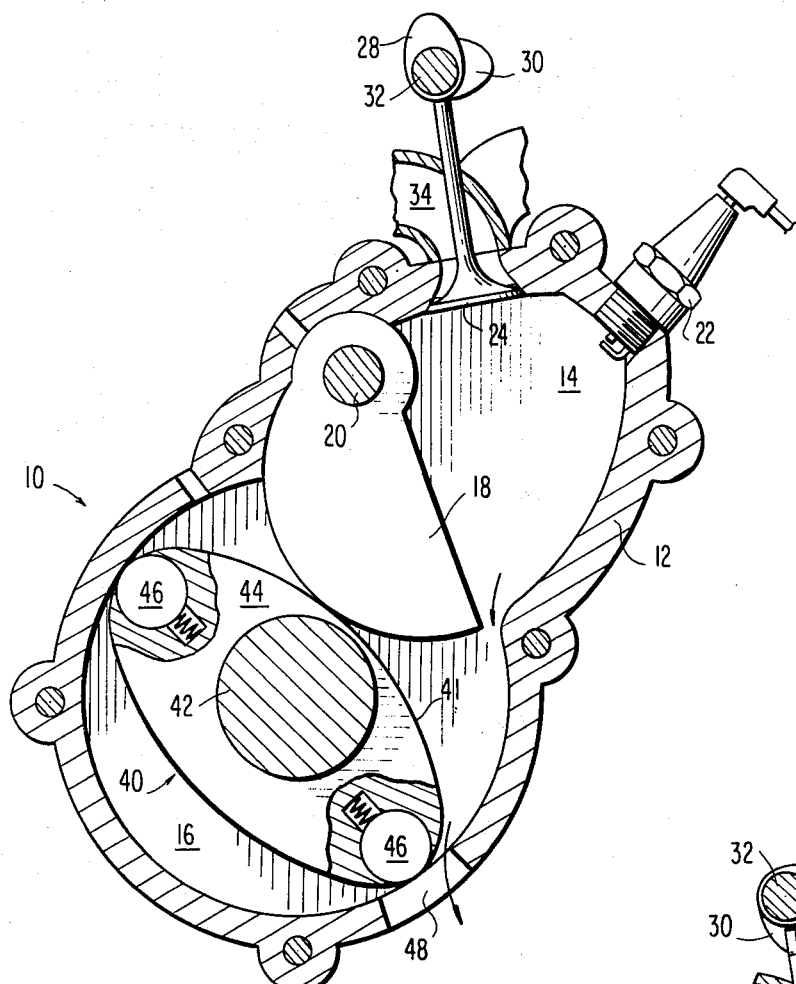
FIG. 4 is a cross-sectional view similar to FIG. 1 showing the power phase of operation of the device of this invention.

With reference to FIG. 4, in the power stroke or phase shown, the pivotal wall moves about pin 20 in a clockwise fashion downwardly against the face 41 of rotor 40, causing rotor 40 to turn shaft 42 in a clockwise fashion. Because face 41 of rotor 40 is not offset as cam surface 44, wall 18 is permitted to open combustion chamber 14 into the circular chamber 16 whereby exhaust gases may exit exhaust port 48 as rotor 40 turns to advance the sealing roller 46 beyond exhaust port 48.

Figure 5:
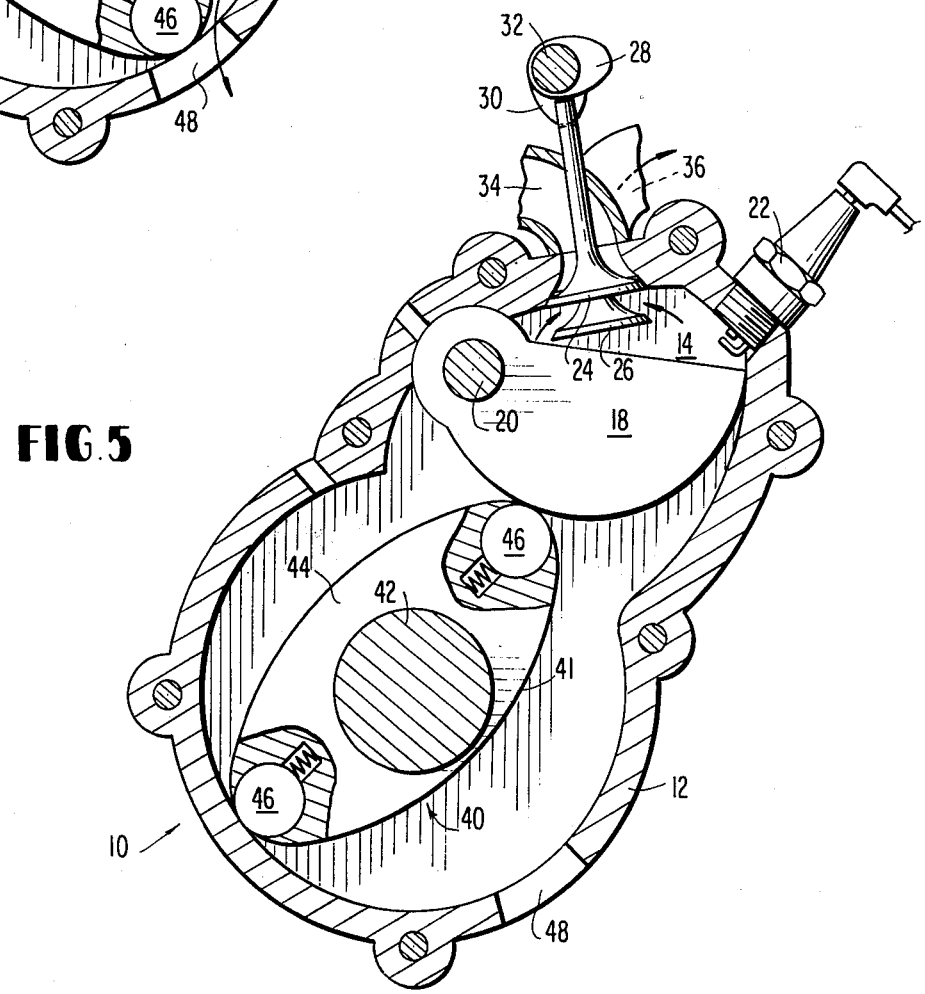
FIG. 5 is a cross-sectional view similar to FIG. 1 showing the exhaust phase of operation of the device of this invention.

With attention to FIG. 5, as the rotor 40 continues to turn, the exhaust phase completes as sealing roller 46 urges pivotal wall 18 into chamber 14. Exhaust valve 26 is opened by cam 30, and as wall 18 advances into chamber 14, the combustion by-products and exhaust materials remaining in chamber 14 are urged into the exhaust manifold 36. When rotating shaft 42 and rotor 40 continues in a clockwise direction, the pivotal wall 18 will pivot clockwise about pin 20 to thereby advance in the direction of the circular chamber against cam surface 44, as shown in FIG. 1, to begin the intake of fuel to combustion chamber 14.

Therefore, in one complete revolution of rotor 40 and drive shaft 42, and four strokes of wall 18, into chamber 14, a complete four stroke cycle has been completed.

As will be obvious to those skilled in the art, multiple units may be coupled together on a common shaft 42 to meet power requirements, as noted above. In addition, conventional spark plug 22 may be replaced by a conventional injector for diesel operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A four cycle rotary engine providing intake, compression, power, and exhaust phases of operation comprising:

a housing defining a first chamber, the walls of the first chamber having the configuration of a wedge in cross-section, and a second chamber, the walls of the second chamber having the configuration of a segment of a circle in cross-section, the chambers being disposed adjacent one to the other;

wall means pivotally mounted within said housing common to the first and second chambers for moving into and out of the chambers including a cam follower disposed within the second chamber;

a rotatable drive shaft extending into the second chamber;

an elongated rotor having a pair of opposed peripheral extensions mounted on said drive shaft within the second chamber;

seal means mounted on the periphery of each of the extensions of said rotor for engaging adjacent wall portions of the second chamber;

cam means defined by the external surface of said rotor for engaging the follower on said wall means for pivoting said wall means into and out of the first and second chambers as said drive shaft rotates said cam means permitting said wall means to open into the second chamber and place said first and second chambers in communication only during the exhaust phase of operation;

means for admitting fuel to the first chamber, ignition means extending into the first chamber, and means for exhausting said chambers carried by said housing.

2. The engine of claim 1 wherein said seal means includes a roller rotatably mounted at each of the extensions of said rotor and biased means carried by said rotor for urging each of said rollers into adjacent wall portions of the second chamber.

3. The engine of claim 2 wherein said exhaust means comprises an exhaust port in each of the chambers and cam actuated valve means at the port in the first chamber for controlling ingress and egress therethrough.

4. The engine of claim 3 wherein the means for admitting fuel to the first chamber includes an inlet port and cam actuated valve means at said port for controlling ingress and egress therethrough.

* * * * *